US006431119B1

(12) United States Patent
Beymer

(10) Patent No.: US 6,431,119 B1
(45) Date of Patent: Aug. 13, 2002

(54) MULTI-PURPOSE CAT STRUCTURE

(76) Inventor: Cyndi M. Beymer, 4236 W. Mission La., Phoenix, AZ (US) 85051

( * ) Notice: Subject to any disclaimer, the term of this patent is extended or adjusted under 35 U.S.C. 154(b) by 12 days.

(21) Appl. No.: 09/704,901

(22) Filed: Nov. 2, 2000

(51) Int. Cl.$^7$ .......................... A01K 1/035; A01K 15/02
(52) U.S. Cl. ........................................ 119/485; 119/706
(58) Field of Search ................. 119/485, 702, 119/706

(56) References Cited

U.S. PATENT DOCUMENTS

| | | |
|---|---|---|
| 4,520,758 A | 6/1985 | Pfriender |
| 4,803,952 A | 2/1989 | Houser |
| 5,320,065 A | 6/1994 | Leopold |
| 5,465,682 A | 11/1995 | Chavallo, Jr. |
| 5,577,465 A | 11/1996 | Cook ......................... 119/498 |
| 5,791,293 A | 8/1998 | Northrop et al. ........... 119/498 |
| 5,964,189 A | * 10/1999 | Northrop et al. ........... 119/482 |

* cited by examiner

*Primary Examiner*—Robert P. Swiatek
(74) *Attorney, Agent, or Firm*—Parsons & Goltry; Robert A. Parsons; Michael W. Goltry

(57) ABSTRACT

A multi-purpose cat structure having a stored mode and a use mode includes a hollow base with a first opening in one of four side walls and a door movable between an open position for inserting and removing a litter box and a closed position in which the first opening is substantially closed. The hollow base has a second opening for the ingress and egress of a cat or the like. A pair of vertical walls are removably attached to an upper surface of the base and an enclosed sleeping/play area, with an ingress and egress opening, is removably attached to an upper edge of the vertical walls in the use mode. The vertical walls and enclosed sleeping/play area are designed to be stored in the hollow base during the stored mode.

10 Claims, 2 Drawing Sheets

MULTI-PURPOSE CAT STRUCTURE

FIELD OF THE INVENTION

This invention relates to a structure designed for use by cats and the like.

More particularly, the present invention relates to a structure incorporating a plurality of cat uses.

In a further and more specific aspect, the present invention concerns a multi-purpose cat structure including sleeping, eating, playing, and litter areas.

BACKGROUND OF THE INVENTION

Within the art of structures for cats and the like, it is common to provide various single feature devices, such as scratching posts, dishes for food and water, beds, play areas, litter boxes, etc. In some instances more than one generally similar feature is combined, for example, a scratching post and play area. In general, the single feature devices are relatively simple but any combined features are generally large, expensive, and difficult or impossible to dismantle, repair and clean. A typical example is the prior art combination of scratching post and play area. Generally, these devices are completely assembled and cannot be disassembled for cleaning or repair. One major reason for this condition is that the entire structure is usually covered in carpet so that the cat can scratch anywhere on the device.

It would be highly advantageous, therefore, to remedy the foregoing and other deficiencies inherent in the prior art.

Accordingly, it is an object the present invention to provide a new and improved multi-purpose cat structure.

Another object of the present invention is to provide a new and improved multi-purpose cat structure which is easy to disassemble for storage, repairs, and cleaning.

And another object of the present invention is to provide a new and improved multi-purpose cat structure which is relatively inexpensive and simple to manufacture.

Still another object of the present invention is to provide a new and improved multi-purpose cat structure which includes the features of play area, eating area, sleeping area, and litter area.

Yet another object of the present invention is to provide a new and improved multi-purpose cat structure including an improved litter area which is easy to clean and which reduces the spreading of litter.

SUMMARY OF THE INVENTION

Briefly, to achieve the desired objects of the present invention in accordance with a preferred embodiment thereof, provided is a multi-purpose cat structure with a stored mode and a use mode including a hollow base having a first opening for inserting and removing a litter box and a second opening for the ingress and egress of a cat. Further included are vertical walls removably attached to an upper surface of the base in the use mode and an enclosed sleeping/play area is removably attached to an upper edge of the vertical walls in the use mode. The sleeping/play area includes at least one ingress and egress opening and the vertical walls and enclosed sleeping/play area are designed to be stored in the hollow base during the stored mode.

In a preferred embodiment, the multi-purpose cat structure has a stored mode and a use mode including a hollow base with a first opening in one of four side walls and a door movable between an open position for inserting and removing a litter box and a closed position in which the first opening is substantially closed. The hollow base has a second opening for the ingress and egress of a cat or the like. A pair of vertical walls are removably attached to an upper surface of the base and an enclosed sleeping/play area, with several ingress and egress openings, is removably attached to an upper edge of the vertical walls in the use mode. The vertical walls and enclosed sleeping/play area are designed to be stored in the hollow base during the stored mode.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figures 1, 2:
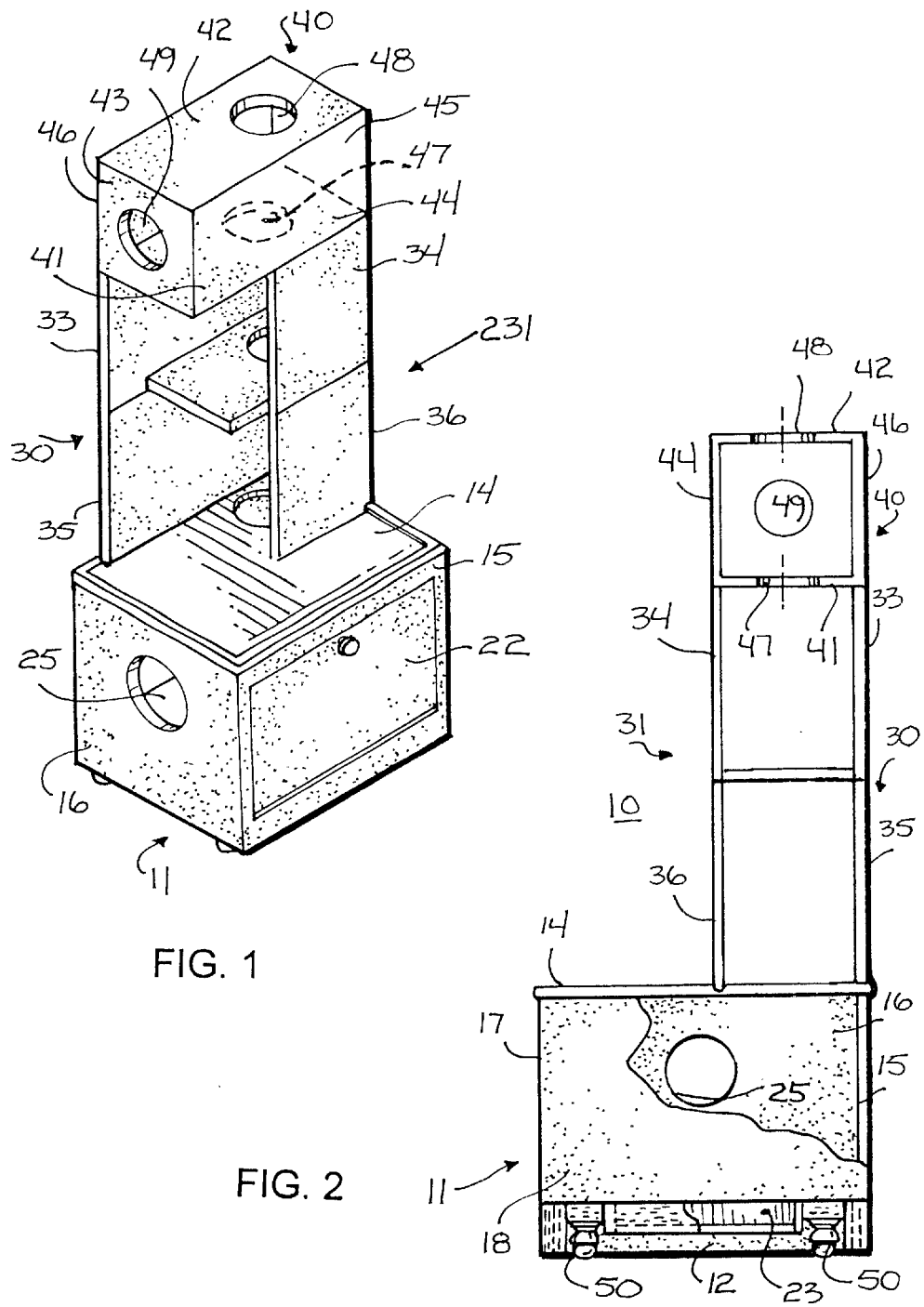
FIG. 1 is a perspective view of a multi-purpose cat structure in accordance with the present invention.
FIG. 2 is a rear view of the cat structure of FIG. 1, portions thereof removed.

The present invention provides new and improved structure for multiple uses by cats and the like. Turning to FIG. 1, a perspective view is illustrated of a multi-purpose cat structure 10, in accordance with the present invention. As will be explained in more detail presently, structure 10 has a stored mode and a use or fully assembled mode, the use or assembled mode being illustrated in FIG. 1. In the preferred embodiment illustrated herein, structure 10 includes a hollow base 11 with a bottom 12 (illustrated in FIGS. 2 and 3), a top 14, and four side walls 15–18.

A first opening 20 in side wall 15 includes a door 22 movable between an open position (illustrated in FIG. 3) for inserting and removing a litter box (not shown) and a closed position (illustrated in FIG. 1) in which opening 20 is substantially closed. In this preferred embodiment hollow base 11 includes an area 23 formed below bottom 12 for receiving a weight such as a paving block, stone, brick etc., or other heavy object. The weight positioned at the lowest portion of structure 10 adds stability. A removable litter box (not shown) is positioned in hollow base 11. In a specific embodiment, a litter tray fits snugly against side walls 15–18 of hollow base 11, so that litter pawed by a cat will not accumulate below or on the sides of the litter tray, but will fall back into the tray. A second opening 25 is provided in side 16 of hollow base 11 for the ingress and egress of a cat or the like. Here it should be understood that structure 10 is primarily designed for use by house cats, but it may be used equally well by other pets, all of which will be referred to herein as "cats" for simplicity in this description.

Vertical walls 30 and 31 are removably attached to upper surface 14 of hollow base 11 in the use mode. Preferrably, vertical walls 30 and 31 each include at least an upper section 33 and 34 and a lower section 35 and 36, respectively. Also, at least one horizontal platform 37 is positioned between walls 30 and 31 with one edge adjacent the juncture of upper section 33 and lower section 35 of wall 30 and the opposed edge adjacent the juncture of upper section 34 and lower section 36 of wall 31. As will be understood by those skilled in the art, more or fewer sections may be included in each vertical wall 30 and 31, and additional vertical walls may be included, if desired. Also, while vertical wall 31 is illustrated as narrower than vertical wall 30 to provide a different play area, it will be understood that additional and/or different walls with different widths and shapes (e.g., corners, irregular edges, etc.) could be provided if desired. Thus, various sleeping, eating and playing areas can be formed. Top 14 of hollow base 11 can be covered with linolium, tile, etc. to provide an easily cleanable eating area.

An enclosed sleeping/play area 40 is removably attached to an upper edge of vertical walls 30 and 31 in the use mode. Enclosed sleeping/play area 40 includes a lower surface 41, an upper surface 42, and three side walls 43, 44 and 46. The fourth side is an open area 45. Open area 45 permits easy access to the interior of area 40. To fully enclose area 40, structure 10 can be positioned against a wall with the wall closing area 45. Enclosed sleeping/play area 40 includes a plurality of ingress and egress openings, for example, an opening 47 in lower surface 41, an opening 48 in upper surface 42, and an opening 49 in side wall 43. Clearly, additional or fewer openings can be provided if desired. Also, in this embodiment, enclosed sleeping/play area 40 is constructed to remain assembled but it will be understood that it could be designed to be conveniently disassembled for the storage mode, if desired.

In many instances, structure 10 is constructed large enough to be unwieldly to move about conveniently. To this end, casters 50 are provided on lower surface 12 of hollow base 11, as best seen in FIG. 2. In this preferred embodiment, casters 50 are recessed into lower surface 12 so that side walls 15, 16, 17, and 18 of hollow base 11 are spaced only a short distance from a supporting surface, floor, or the like. By reducing the spacing of hollow base 11 from the supporting surface there is less chance of litter, toys, and the like accumulating beneath structure 10.

Figure 3:
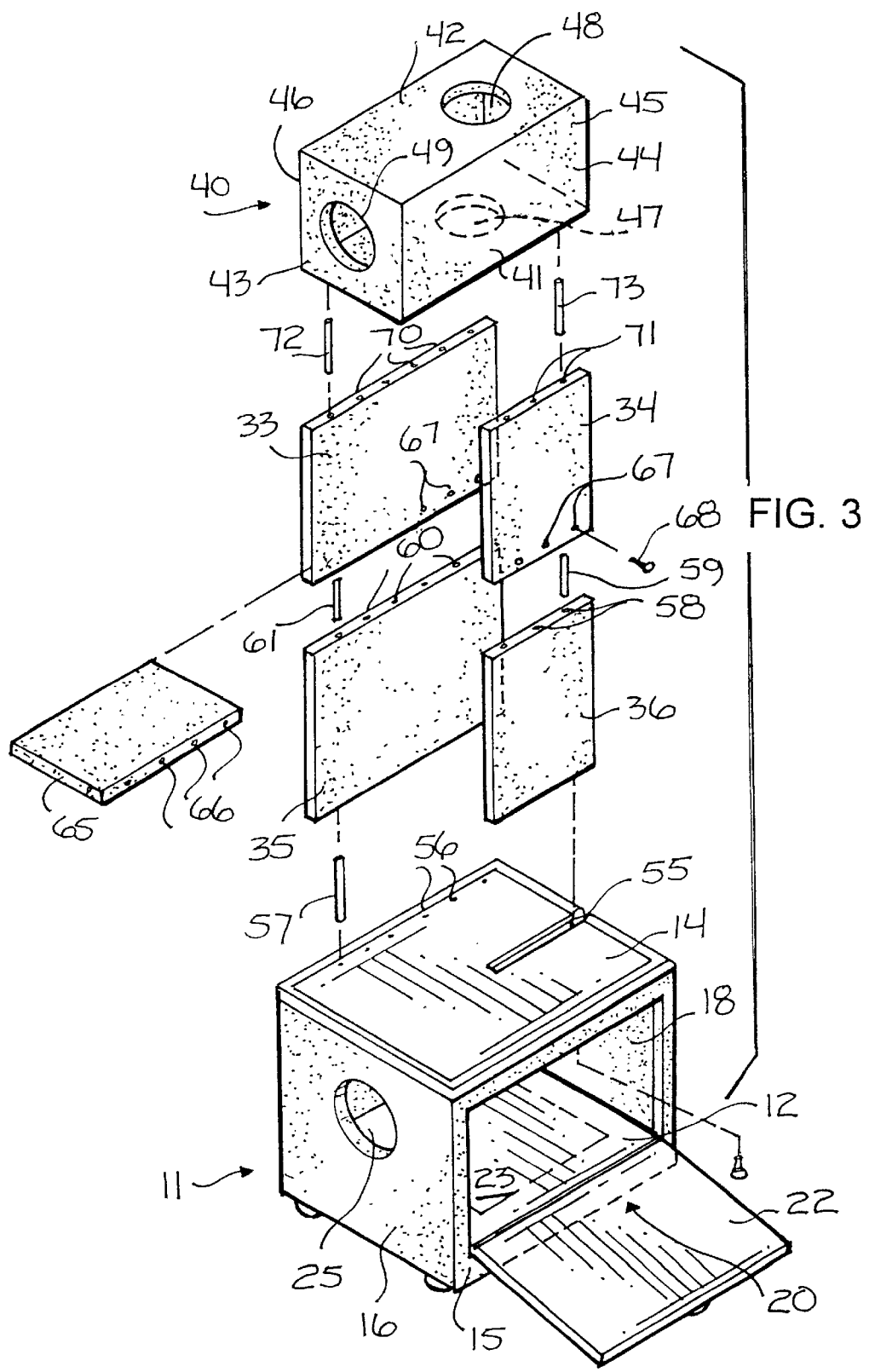
FIG. 3 is an exploded perspective view of the cat structure of FIG. 1 illustrating the various components and inter-relationship thereof.

Turning now to FIG. 3, it can be seen that multi-purpose cat structure 10 can be conveniently disassembled and placed in a storage mode. Upper surface 14 of hollow base 11 has a slot 55 formed therein and extending partially therethrough. Slot 55 is designed to receive a lower edge of lower section 36 of vertical wall 31 in supporting engagement therein. A line of holes 56 is formed in upper surface 14 spaced from and parallel to slot 55 with a similar line of holes (not visible) formed in the lower edge of lower section 35 of vertical wall 30. Dowels 57 (only one illustrated for convenience) are adapted to be received in holes 57 in surface 14 and in the holes in the lower edge of section 35 for removably mounting section 35 in the vertical position. A line of holes 58 in the upper edge of section 36 and a line of holes (not visible) in the lower edge of section 34 are designed to receive dowels 59 therein for removably mounting section 34 in the vertical position above section 36. A line of holes 60 in the upper edge of section 35 and a line of holes (not visible) in the lower edge of section 33 are designed to receive dowels 61 therein for removably mounting section 33 in the vertical position above section 35.

A horizontal platform 65 is removably positioned between vertical walls 30 and 31 by providing lines of holes 66 in the opposed edges. Mating holes 67 are provided in vertical walls 30 and 31 (in this embodiment in upper sections 33 and 34) and pins 68 are inserted through holes 67 in walls 30 and 31 and into holes 66 in opposed edges of platform 65 to hold platform 65 rigidly but removably between vertical walls 30 and 31. Here it will be understood that more horizontal platforms can be provided if desired.

A line of holes 70 is provided in the upper edge of upper section 33 of vertical wall 30 and a line of holes 71 is provided in the upper edge of upper section 34 of vertical wall 31. Mating holes (not visible) are provided in lower surface 41 of sleeping/play area 40. a first set of dowels 72 are designed to be positioned in holes 70 in section 33 and a second set of dowels 73 are designed to be positioned in holes 71 in section 34. Dowels 72 and 73 are then engaged in the holes in lower surface 41 of sleeping/play area 40 to rigidly and removably mount sleeping/play area 40 on the upper edges of vertical walls 30 and 31.

Thus, as can be seen in FIG. 3, vertical walls 30 and 31, platform 65 and sleeping/play area 40 can be quickly and easily disassembled for repair, cleaning, and/or storage. Door 22 is constructed to receive sections 33, 34, 35, and 36, platform 65 and sleeping/play area 40 conveniently therethrough. Also, hollow base 11 is constructed so that all of the components, e.g., sections 33, 34, 35, and 36, platform 65 and sleeping/play area 40, can be easily and conveniently stored therein in the stored mode.

Therefore, a new and improved multi-purpose cat structure has been disclosed with a stored mode and a use mode. The new and improved multi-purpose cat structure is easy to disassemble for storage, repairs, and cleaning and is relatively inexpensive and simple to manufacture. Further, the new and improved multi-purpose cat structure includes the multiple features, such as play area, eating area, sleeping area, litter area, etc. Also, the new and improved multi-purpose cat structure includes an improved litter area which is easy to clean and which reduces the spreading of litter.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A multi-purpose cat structure with a stored mode and a use mode comprising:

a hollow base having a first opening for inserting and removing a litter box and a second opening for the ingress and egress of a cat;

vertical walls removably attached to an upper surface of the base in the use mode;

an enclosed sleeping or play area removably attached to an upper edge of the vertical walls in the use mode, the sleeping or play area including at least one ingress and egress opening; and the vertical walls and enclosed sleeping or play area being designed to be stored in the hollow base during the stored mode.

2. A multi-purpose cat structure with a stored mode and a use mode as claimed in claim 1 wherein the hollow base further includes casters attached to a lower surface of the hollow base.

3. A multi-purpose cat structure with a stored mode and a use mode as claimed in claim 1 wherein the hollow base includes a bottom, a top, and four side walls with the first opening including a door movable between an open position for inserting and removing the litter box and a closed position in which the first opening is substantially closed.

4. A multi-purpose cat structure with a stored mode and a use mode as claimed in claim 3 wherein the door is constructed to receive the vertical walls and enclosed sleeping or play area therethrough.

5. A multi-purpose cat structure with a stored mode and a use mode as claimed in claim 3 wherein the hollow base includes an area under the bottom for receiving a weight.

6. A multi-purpose cat structure with a stored mode and a use mode as claimed in claim 1 wherein the vertical walls each include at least an upper and lower section with at least one horizontal platform positioned therebetween.

7. A multi-purpose cat structure with a stored mode and a use mode as claimed in claim 6 wherein the upper and lower sections of the vertical walls are removably attached to each other, the hollow base, and the enclosed sleeping or play area by dowels fitted into holes.

8. A multi-purpose cat structure with a stored mode and a use mode as claimed in claim 1 wherein the enclosed sleeping or play area includes a lower surface, an upper surface, and at least three side walls, the enclosed sleeping or play area further including ingress and egress openings in the lower surface, the upper surface and one of the side walls.

9. A multi-purpose cat structure with a stored mode and a use mode comprising:
   a hollow base including a bottom, a top, and four side walls with a first opening in one of the four side walls including a door movable between an open position for inserting and removing a litter box and a closed position in which the first opening is substantially closed, and a second opening for the ingress and egress of a cat;
   vertical walls removably attached to an upper surface of the base in the use mode;
   an enclosed sleeping or play area removably attached to an upper edge of the vertical walls in the use mode, the sleeping or play area including at least one ingress and egress opening; and
   the vertical walls and enclosed sleeping or play area being designed to be stored in the hollow base during the stored mode.

10. A multi-purpose cat structure with a stored mode and a use mode comprising:
   a hollow base including a bottom, a top, and four side walls with a first opening in one of the four side walls including a door movable between an open position for inserting and removing a litter box and a closed position in which the first opening is substantially closed, and a second opening for the ingress and egress of a cat;
   the hollow base including an area under the bottom for receiving a weight;
   the hollow base further including casters attached to the bottom of the hollow base;
   two spaced apart vertical walls removably attached to the top of the base in the use mode, the vertical walls each including at least an upper and lower section with at least one horizontal platform positioned therebetween, the upper and lower sections of the vertical walls and the at least one horizontal platform being removably attached to each other, the hollow base, and an enclosed sleeping or play area by dowels fitted into holes;
   said enclosed sleeping or play area been removably attached to an upper edge of the vertical walls in the use mode, the enclosed sleeping or play area including a lower surface, an upper surface, and at least three side walls, the enclosed sleeping or play area further including ingress and egress openings in the lower surface, the upper surface and one of the side walls; and
   the door in the hollow base being constructed to receive the vertical walls and enclosed sleeping or play area therethrough, the vertical walls and enclosed sleeping or play area being designed to be stored in the hollow base during the stored mode.

* * * * *